(12) United States Patent
Fukuda et al.

(10) Patent No.: US 7,177,332 B2
(45) Date of Patent: Feb. 13, 2007

(54) LASER FREQUENCY STABILIZATION DEVICE AND A METHOD FOR LASER FREQUENCY STABILIZATION

(75) Inventors: Kyoya Fukuda, Koganei (JP); Maki Tachikawa, Kanagawa (JP)

(73) Assignee: National Institute of Information and Communications Technology Incorporated Administrative Agency, Koganei (JP)

( * ) Notice: Subject to any disclaimer, the term of this patent is extended or adjusted under 35 U.S.C. 154(b) by 168 days.

(21) Appl. No.: 10/811,142

(22) Filed: Mar. 29, 2004

(65) Prior Publication Data

US 2005/0041704 A1    Feb. 24, 2005

(30) Foreign Application Priority Data

Aug. 20, 2003    (JP)    ............... 2003-296782

(51) Int. Cl.
*H01S 3/13*    (2006.01)
(52) U.S. Cl. ........................................ 372/32
(58) Field of Classification Search ................ 372/32
See application file for complete search history.

(56) References Cited

U.S. PATENT DOCUMENTS

| | | | | |
|---|---|---|---|---|
| 3,742,382 A | * | 6/1973 | Smith ........................ | 372/32 |
| 5,146,185 A | * | 9/1992 | Lewis ........................ | 331/3 |
| 5,457,707 A | * | 10/1995 | Sobey et al. ................ | 372/20 |
| 6,201,821 B1 | * | 3/2001 | Zhu et al. ................... | 372/32 |
| 6,282,215 B1 | * | 8/2001 | Zorabedian et al. ......... | 372/20 |

FOREIGN PATENT DOCUMENTS

| | | |
|---|---|---|
| JP | 10-284772 | 10/1998 |
| JP | 2001-285064 | 10/2001 |
| JP | 2002-76890 | 3/2002 |

OTHER PUBLICATIONS

Talvitie, H. et al., "Frequency stabilization of a diode laser to Doppler-free spectrum of molecular iodine at 633nm", Optics Communications, 152 (Elsevier Science B.V.), pp. 182-188 (Jun. 15, 1998), pp. 1,10.

(Continued)

*Primary Examiner*—Minsun Oh Harvey
*Assistant Examiner*—Rory Finneren
(74) *Attorney, Agent, or Firm*—Westerman, Hattori, Daniels & Adrian, LLP.

(57) ABSTRACT

A method for stabilizing a laser frequency using sub-Doppler spectral spectrum of atoms, and a laser frequency stabilization device used in the method which is comprised of a gas charged cell, a laser, a laser frequency adjusting means, a laser beam dividing means for dividing the laser beam into a pump beam and a probe beam, a photo detector for measuring intensity of the probe beam after passed through the cell, an ON/OFF means for cutting off the pumping beam at a constant time interval, a computing means for obtaining the intensity of the probe beam, a demodulated signal of the probe beam, the difference in intensity between the probe and pumping beam, and a difference in demodulated signal, and a feedback means which feeds back the information to the laser frequency adjusting means, thereby stabilizing the frequency of the laser.

11 Claims, 9 Drawing Sheets

OTHER PUBLICATIONS

Ohshima, S., et al., "*Spectral width of saturated absorption spectra of Cs with a laser diode*", IEEE Journal of Quantum Electronics, vol. QE-23, No. 5, pp. 473-475 (May 1987), p. 1.

Tanaka, U. et al., "*Frequency stabilization of diode laser using external cavity and Doppler-Free atomic spectra*", Japanese Journal of Applied Physics, vol. 33, Part 1, No. 3B, pp. 1614-1622, (Mar. 1994), p. 1.

Li, R. N. et al., "*Frequency-stabilization of a diode laser with ultra-low power through linear selective reflection*", Optics Communications, 146 (Elsevier Science B.V.), pp. 186-188 (Jan. 15, 1998), p. 1.

Briaudeau, S. et al., "Coherent Doppler narrowing in a thin vapor cell: Observation of the Dicke regime in the optical domain", Physical Review A, vol. 57, No. 5 (The American Physical Society), pp. R3169-R3172 (May 1998), p. 2.

Izmailov, A. C., "*Manifestations of sub-Doppler structure of the spectral lines of gas particles in the radiation of a traveling monochromatic pump wave*", Opt. Spectrosc. 74 (1), 41-48 (The Optical Society of America), pp. 25-29 (Jan. 1993), p. 2.

Tachikawa, M. et al., "*Sub-Doppler spectroscopy of Cs atoms optically pumped in a thin cell*", Japanese Journal of Applied Physics, vol. 37, Part 2, No. 12B, pp. L1556-L1559 (Dec. 1998), p. 2.

Otake, M. et al., "*High-resolution spectroscopy of velocity-selected atoms in a thin cell*", Applied Physics B—Lasers and Optics, 74, pp. 503-508 (2002), p. 2.

Nakagiri et al, "*Technical Report for Study of Electrical Wave*", Denpa Kenkyu Gihou, Vo.29, No. 149 (Feb. 1983), pp. 97-115 (English language translation of highlighted portions only), p. 6.

Izmailov, A. et al., "*On Sub-Doppler absorption resonances based on optical pumping and transit of atoms in a thin cell*", Laser Physics vol. 14, No. 1 (2004), pp. 30-38, p. 12.

* cited by examiner

LASER FREQUENCY STABILIZATION DEVICE AND A METHOD FOR LASER FREQUENCY STABILIZATION

BACKGROUND OF THE INVENTION

1. Field of the Invention

The present invention generally relates to a laser frequency stabilization device using sub-Doppler spectrum obtained by irradiating a thin cell with a probe beam and a pumping beam. The invention also relates to a method for laser frequency stabilization.

2. Description of the Related Art

The laser is a basic tool in various research fields. When utilizing lasers, in order to realize high precision and high repeatability in measurement, it is necessary to control the laser such that the frequency of the laser beam coincides with a specific reference value (i.e., the frequency of the laser should be stabilized). In a cell, atoms move at various velocities. Thus, the resonance frequencies that are characteristic to atoms include a Doppler shift. The amount of the frequency shift depends on the various velocities of atoms. The absorption spectrum generated from laser irradiation comprises various Doppler spectrums from atoms of various velocities. In this spectrum, resonance lines characteristic to the atoms velocities are overlapping and cannot be observed separately. A sub-Doppler spectrum, which is another resonance spectrum characteristic to the atoms is clearly separated from the Doppler spectrum and is obtainable by various ways. To obtain better stability, a sub-Doppler spectrum of atoms or molecules is generally used as an absolute frequency reference. Narrow atomic (molecular) lines observed by saturated absorption spectroscopy (H. Talvitie, M. Merimaa, B. Ikonen: Opt. Commun. 152, 182 (1998), S. Ohshima, Y. Nakadan, Y. Koga: IEEE J. Quantum Electron. QE-23, 473 (1987), U. Tanaka, T. Yabuzaki: Jpn. J. Appi. Phys. 33, 1614 (1994)) or selective reflection spectroscopy have been used for laser frequency stabilization (R. N. Li, S. T. Jia, D. Bloch, M. Ducloy: Opt. Commun. 146, 186 (1998)).

Recently, transmission spectroscopy utilizing a thin vapor cell has attracted considerable attention as a simple new method of sub-Doppler spectroscopy and as a useful technique for attaining laser frequency stabilization. A single light beam transmission spectroscopy with an ultra thin Cs cell (10 to 100 μm end-wall gaps) was used to obtain sharp resonance which originated from the coherent Doppler narrowing (S. Briaudeau, S. Saltiel, G. Nienhuis, D. Bloch, M. Ducloy: Phys. Rev. A 57, R3169 (1998)]. On the other hand, the optical pumping in of a thin vapor cell also produces a non-Maxwellian velocity distribution, which appears as a sub-Doppler structure in the absorption spectrum of the probe beam (A. Izmailov: Opt. Spectrosc 74 25 (1993), M. Tachikawa, K. Fukuda, S. Hayashi, I. Kawamura: Jpn. J. Appl. Phys. 37, L1559 (1998)).

The inventors have observed a hyperfine-resolved spectrum of Cs $D_2$ line with a configuration in which a single laser beam from a diode laser is split into two paths: one beam optically pumps Cs atoms on the $D_2$ line, and the other probes the absorption on the same line from a perpendicular direction (M. Otake, K. Fukuda, M. Tachikawa: Appl. Phys. B 74, 503 (2002)). Utilizing the pump-probe technique results in improvements such as the sharp resonance can be observed even in relatively longer cells (0.5 to 5 mm end-wall gaps) and a better signal-to-noise ratio. Further, the technique can provide a laser frequency stabilization device.

SUMMARY OF THE INVENTION

It is an object of the present invention to obtain a method for stabilizing a laser frequency using the sub-Doppler spectral spectrum of an atom, and to obtain a laser frequency stabilization device utilizing the method.

It is another object of the present invention to provide a method for stabilizing laser frequency using a simple and appropriate device as compared to conventional devices.

The object described above is achieved by the following invention:

According to the present invention, a laser frequency stabilization device comprises: a cell into which gas is charged, an extended cavity diode laser (ECDL), a laser frequency adjusting means for adjusting frequency of a laser beam emitted from the ECDL, a laser beam dividing means for dividing the laser beam from the ECDL into a pump beam and a probe beam, a photo detector for measuring the intensity of the beam after the probe beam has passed through the cell, an ON/OFF means for cutting off the pumping beam at a constant time interval, a computing means for obtaining: intensity of the probe beam detected by the photo detector, a demodulated signal of the probe beam, a difference in intensity of probe beam between a case in which the pumping beam is ON and OFF, and a difference in demodulated signal, and a feedback means for obtaining information concerning the laser frequency of the laser beam from the ECDL using the difference in the demodulated signal obtained by the computing means, feeds back the information to the laser frequency adjusting means, thereby stabilizing the frequency of the ECDL.

According to the present invention, the cell is preferably square pole or cylindrical in shape.

According to the present invention, the length of the cell is preferably 3 mm to 7 mm.

According to the present invention, the cell is preferably cylindrical in shape and the length of the cell is preferably 5 mm.

According to the present invention, the gas charged into the cell is preferably cesium atom.

According to the present invention, the gas charged into the cell is preferably cesium atom, the ECDL is preferably adjusted such that its frequency is tuned to a $D_2$ line of the cesium atom.

According to the present invention, the number of ECDL used is preferably one, and the maximum intensity wavelength of the laser beam is preferably 850 nm to 854 nm.

According to the present invention, the laser frequency adjusting means preferably includes injection current control means which controls current injected into the ECDL and/or voltage control means which controls voltage applied to the ECDL.

According to the present invention, the ON/OFF means is preferably an optical chopper that rotates at a predetermined velocity.

According to the present invention, a laser frequency stabilization device preferably comprise a first optical setup for introducing the probe beam into a flat surface of the cell, and a second optical setup for introducing the pumping beam into a side surface of the cell, wherein the second optical setup has optical means for increasing the diameter of the pumping beam.

According to another aspect of the present invention, a laser beam frequency stabilization method utilizing the sub-Doppler spectrum of atoms comprises: a beam dividing process which divides a laser beam from an ECDL to obtain a pumping beam and a probe beam, a beam introducing process for introducing the pumping beam and the probe beam, divided by the beam dividing process, into a cell in which gas is charged, a first demodulated signal obtaining process which modulates the frequency of the ECDL by laser frequency adjusting means for lock-in detection to obtain a demodulated signal of the probe beam, a second demodulated signal obtaining process in which irradiation/no irradiation of the pumping beam to the cell is repeated at constant time interval by ON/OFF means and lock-in detection which is in synchronization with this interval is carried out to obtain a demodulated signal of the probe beam, and a feedback process for feeding back, to the laser frequency adjusting means, any error signal which may be obtained from the demodulated signal of the probe beam obtained in the second demodulated signal obtaining process.

The present invention provides a method for stabilizing a laser frequency utilizing the sub-Doppler spectrum of atoms, and a frequency stabilizing laser device used in the method.

The invention also provides a method for stabilizing the laser frequency using a simple and appropriate device as compared to conventional devices.

DESCRIPTION OF THE PREFERED EMBODIMENTS

Figure 1:
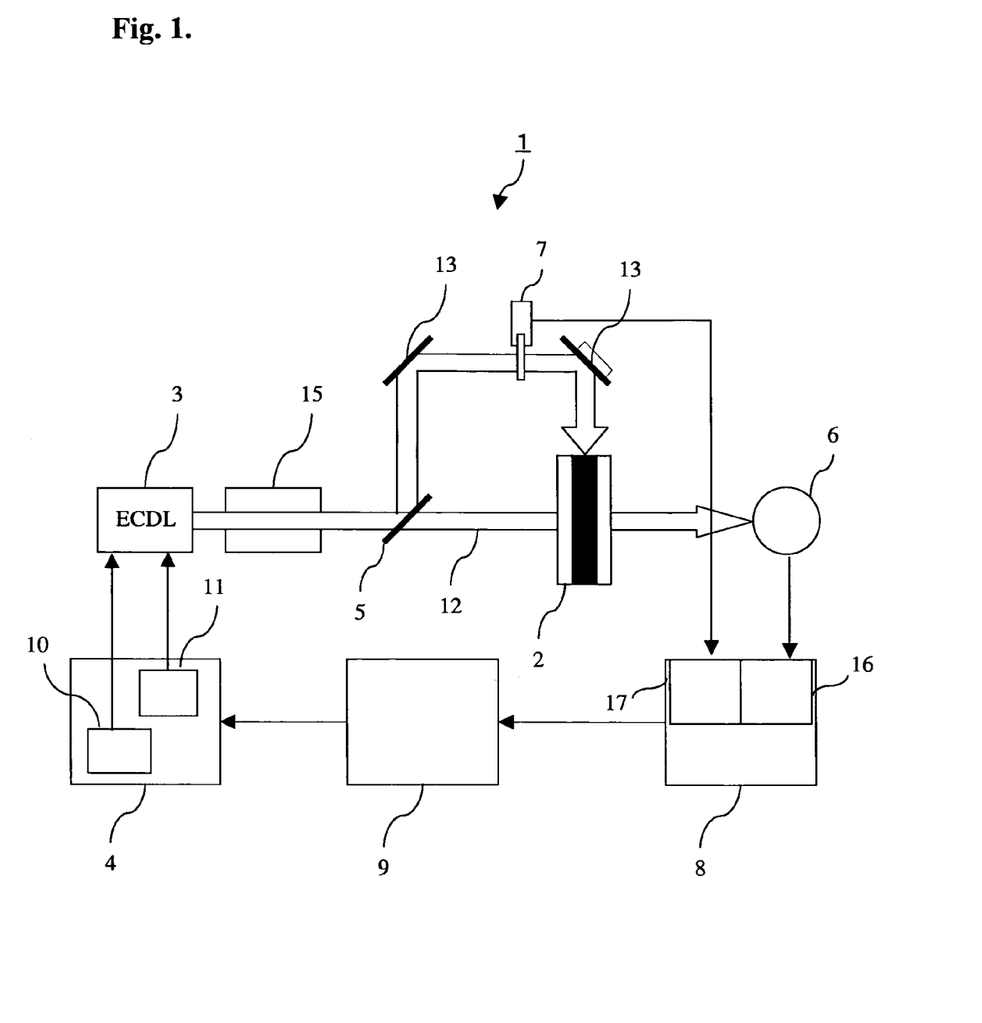
FIG. 1 shows a schematic diagram of a laser frequency-stabilized device according to the present invention.

The present invention will be explained based on the drawings. FIG. 1 shows a configuration of a laser frequency-stabilized device according to an embodiment of the present invention. As shown in FIG. 1, the laser frequency-stabilized device 1 of the present invention comprises: a cell 2 in which gas is charged; an ECDL 3; a laser frequency adjusting means 4 for adjusting a frequency of the ECDL; a laser beam dividing means 5 (BS) for dividing a laser beam from the ECDL into a pumping beam and a probe beam; a photo detector 6 which measures beam intensity after the probe beam passes through the cell; an ON/OFF means 7 (chopper) which cuts off the pumping beam at constant time interval; computing means 8 which obtains intensity of the probe beam detected by the photo detector, a demodulated signal of the frequency-modulated probe beam, a difference in intensity of the probe beam between a case in which the pumping beam is ON and a case in which the pumping beam is OFF, and a difference in demodulated signal; and feedback means 9. The feedback means 9 obtains information concerning the laser frequency of the ECDL using the difference in the demodulated signal obtained by the computing means, feeds back the information to the laser frequency adjusting means, thereby stabilizing the frequency of the ECDL. In FIG. 1, reference number 10 represents injection current control means, and reference number 11 represents voltage control means.

A cell is not limited to gas charged cells only, and a non-gas cell can be used. Examples of shapes of the cell are square pole and cylindrical shape, and the latter shape is preferable.

When a cylindrical cell is used, its diameter is not especially limited, but the diameter should be 1 mm to 100 mm, preferably 10 mm to 50 mm, and more preferably 20 mm to 40 mm. The length of the cell is not limited, but a preferable length is 0.1 mm to 10 mm. As made clear in the embodiment of this specification, a thickness of an inner portion of the cell (a portion of the cell into which gas is charged) is, for example, 0.5 mm to 10 mm, preferably 2 mm to 10 mm, more preferably 3 mm to 7 mm, more preferably 4 mm to 6 mm and specially 5 mm.

A plurality of ECDLs may be used but it is preferable to use a single ECDL. If one ECDL is used, the device is less complicated. A preferable ECDL emits a laser beam with a maximum intensity wavelength of 850 nm to 854 nm, and more preferably near 852 nm. It is preferable that the ECDL is adjusted such that its frequency is tuned to the $D_2$ line of cesium atom.

The laser frequency adjusting means 4 includes, for example, the injection current control means 10 and/or the voltage control means 11 (a piezoelectric transducer: PZT). The injection current control means 10 controls current injected into the ECDL and the voltage control means controls voltage to be applied to the ECDL. A known current adjusting device that controls current to be injected into the ECDL can be used as the injection current control means.

The voltage control means preferably includes a piezoelectric element, and has a circuit that controls voltage to be applied to the ECDL based on the control information from the later-described feedback means.

The laser beam dividing means is means for dividing a laser beam into two paths. The laser beam dividing means is not especially limited only to a divider which can divide a laser beam into two paths, and a known beam splitter such as an optical element can be used. The photo detector is a device for measuring the intensity of the beam. The photo detector is not especially limited only to a detector which can measure the intensity of laser beam and a known photo detector can be used. As the photo detector, it is possible to use those described in the following publications: Japanese Patent Publications Nos. H 10-284772, 2001-285064, 2002-76890, Nakagiri et al, and Denpa Kenkyu Gihou Vo.29, No.149 pp 97-115(1983).

The ON/OFF means is means for cutting off and not cutting off a beam at a constant time interval. The ON/OFF means is not limited only to one which can cut off a beam at constant time interval, and known ON/OFF means can be used. For example, known optical choppers or devices that irradiate a beam at a constant time interval can be used as the ON/OFF means. The time interval of the optical chopper is, for example, about 1.5 kHz.

Figure 2:
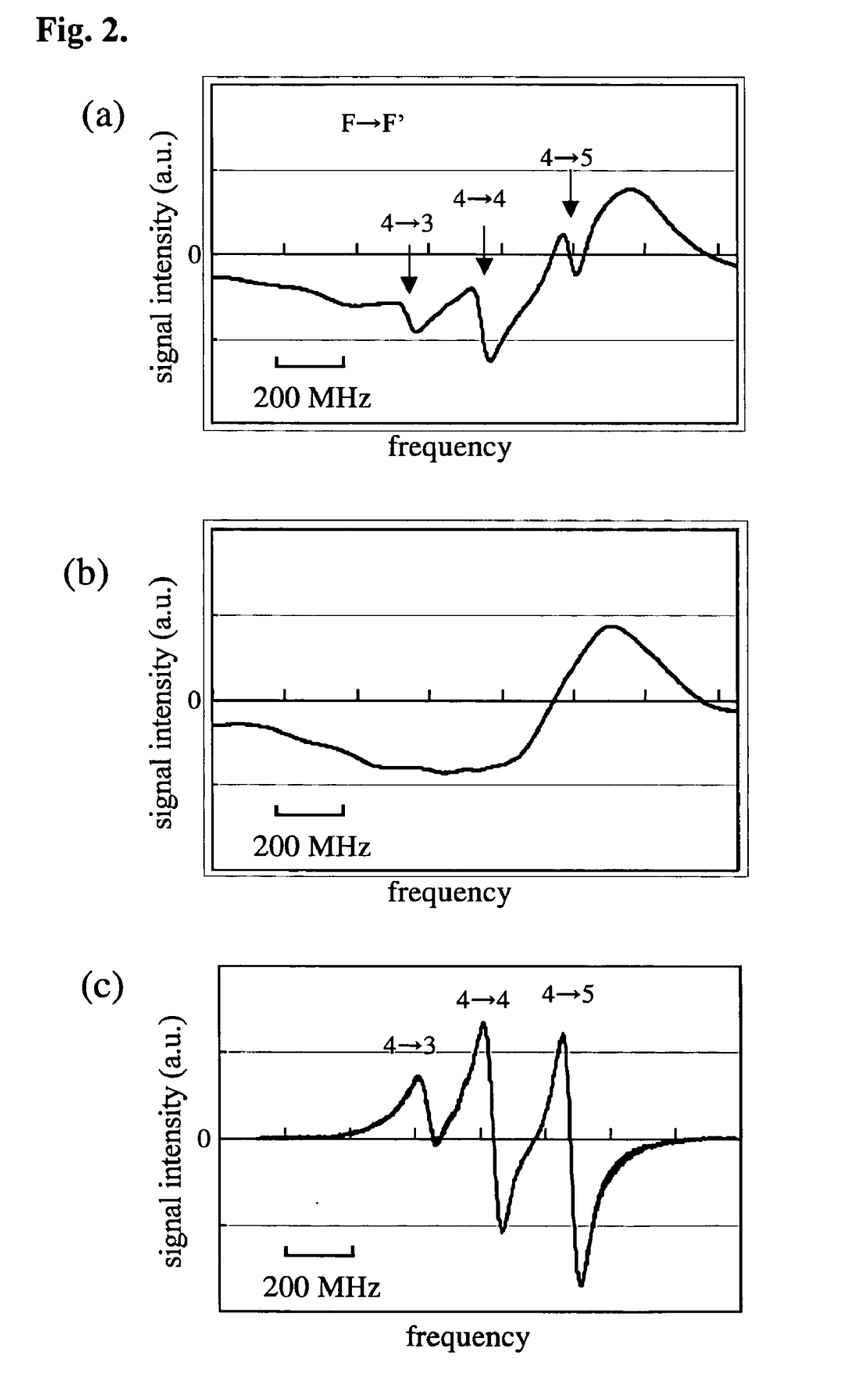
FIG. 2 shows the first derivative signal of the absorption spectrum of the Cs $D_2$ line from the lock-in amplifier #1 when the pumping beam is on [FIG. 2(a)] and off [FIG. 2(b)]. The cell length is 1 mm. The output from the lock-in amplifier #2 is shown in [FIG. 2(c)]. This signal is used for frequency-stabilization of the laser.

A computing means, for example, includes a first lock-in amplifier 16 and a second lock-in amplifier 17. According to this computing means, the first lock-in amplifier amplifies output of the photo detector. The second lock-in amplifier obtains information concerning time during which the ON/OFF means irradiated or did not irradiate the pumping beam, divides the output of the first lock-in amplifier into one which was irradiated with pumping beam (e.g., FIG. 2(a)) and one which was not irradiated with pumping beam (e.g., FIG. 2(b)), and obtains a spectrum difference (frequency discrimination spectrum; e.g., FIG. 2(c)).

The lock-in amplifier is an amplifier using lock-in detection. The lock-in detection is a method for detecting spectrum with reasonably good S/N using phase sensitive detection by modulating a signal to move its spectrum to a frequency band separated away from the main component of the noise spectrum.

The feedback means obtains information that is to be fed back to the ECDL using, for example, the difference (difference of demodulated signal of the sub-Doppler spectrum between a case in which the pumping beam was irradiated and a case in which the pumping beam was cutted off). That is, when the difference is represented by means of a graph shown in FIG. 2(c), the difference is locked to F=4→F'=3 component, F=4→F'=4 component or F=4→F'=5 F=4→F'=5 component as the lock position from the environment around which a portion where the signal intensity becomes zero. When the difference is locked to the F=4→F'=5 component, the feedback information is obtained such that if the intensity of the spectrum difference becomes negative, the frequency of the ECDL is lowered based on the graph of FIG. 2(c), and if the intensity of the spectrum difference becomes positive, the frequency of the ECDL is increased based on the graph of FIG. 2(c)

An example of the feedback information is information concerning voltage that is to be applied to the voltage adjusting means comprising the piezoelectric element as a laser frequency adjusting means.

A known technique can be used as the optical setup which controls the beam passage of the laser beam. In this invention, the optical setup includes a first optical setup for introducing the probe beam into a flat surface of the cell 12, and a second optical setup for introducing the pumping beam into a side surface of the cell 13a and 13b. The second optical setup may have the optical means for increasing the beam diameter of the pumping beam. Examples of optical means for increasing the beam diameter of the pumping beam are a lens and a pair of opposed lenses 37.

Next, the operation of the frequency stabilization device having the above-described configuration, i.e., the stabilizing method of laser frequency will be explained. The laser frequency stabilizing method of this invention comprises a beam dividing process which divides a laser beam from an ECDL to obtain a pumping beam and a probe beam, a beam introducing process for introducing the pumping beam and the probe beam divided by the beam dividing process into a cell in which gas is charged, a first demodulated signal obtaining process which modulates the frequency of the ECDL by a laser frequency adjusting means for lock-in detection to obtain a demodulated signal of the probe beam, a second demodulated signal obtaining process in which irradiation/no irradiation of the pumping beam to the cell is repeated at constant time interval by ON/OFF means and lock-in detection which is in synchronization with this interval is carried out to obtain a demodulated signal of the probe beam, and a feedback process for feeding back to the laser frequency adjusting means, an error signal obtained from the demodulated signal of the probe beam obtained in the second demodulated signal obtaining process.

EXAMPLE

Figure 9:
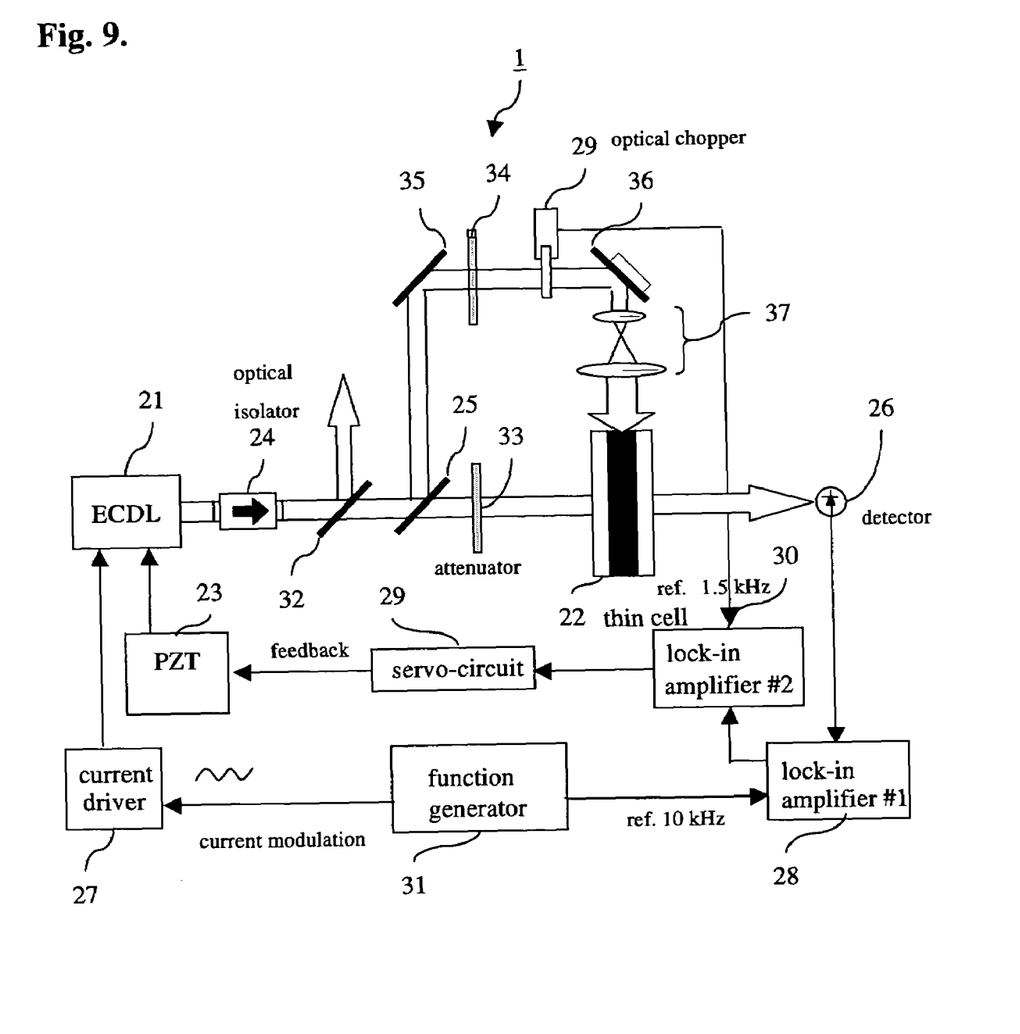
FIG. 9 shows a setup of the experiment to stabilize the ECDL.

The setup of the experiment to stabilize the ECDL frequency is shown in FIG. 9. In FIG. 9, 21 denotes EDCL, 22 denotes a vapor cell, 23 denotes PZT, 24 denotes an optical isolator, 25 denotes a beam splitter, 26 denotes detector, 27 denotes a current driver, 28 denotes the first lock-in amplifier, 29 denotes an optical chopper, 30 denotes the second lock-in amplifier, 31 denotes function generator, 32 denotes a beam splitter, 33 denotes an attenuator, 34 denotes an attenuator, 35 denotes an optical element, 36 denotes an optical element, and 37 denotes a couple of lenses. Cs vapor cells made of Pyrex glass with a thickness of 3 mm were prepared. They are cylindrical and have an inner diameter of 30 mm. The gaps between the end walls (cell length) are 0.5, 1, 2, 5 and 10 mm. The number density of Cs atoms is approximately $3 \times 10^{10}/cm^3$ at room temperature. In this condition, the mean free path for the velocity-changing collision is 1.4 m. The ECDL (Newfocus 6226) oscillates at 852 nm near the Cs $D_2$ line, and its radiation is linearly polarized. Its oscillation line width is reduced to 500 kHz (50 ms) by optical feedback from an external grating mounted on a piezoelectric transducer (PZT). The frequency is tuned over the F=4→F'=3, 4, 5 hyperfine components by changing the PZT voltage.

The laser beam is split into two paths after passing through an optical isolator 15. One beam is introduced into the cell from its sidewall after being expanded by a lens-pair. The whole volume in the cell is covered by this pumping radiation. The other beam passes through the center region of the cell under normal incidence as a probe beam. The probe beam is linearly polarized parallel to the pump polarization, and has a diameter of 5 mm. A typical probe intensity is 20 $\mu W/cm^2$, which is kept sufficiently low to avoid the saturation dips caused by the reflection from the glass surface.

To obtain the linear absorption signal, the probe beam is focused on a highly sensitive low-noise photo-detector (New focus 2001). The laser frequency is modulated by controlling the injection current at 10 kHz. The frequency-modulation amplitude is approximately 25 MHz. The output signal from the photo-detector is lock-in detected at the modulation frequency by the lock-in amplifier #1. The time constant of the low-pass filter is 100 $\mu s$. FIGS. 2(a) and (b) show the observed first derivative signals from the lock-in amplifier #1 when the pumping beam is on and off, respectively. The length of the cell is 1 mm. When the pumping beam irradiates the cell, three hyperfine components are resolved from each other, as shown in FIG. 2(a). They are caused by the population transfer of slow atoms from the F=4 hyperfine level to the F=3 hyperfine level. When the pumping beam is blocked, these components are Doppler-broadened, and not resolved (see FIG. 2(b)). It should be noted in FIG. 2(a) that these sub-Doppler structures are superposed on the Doppler-broadened background. To remove this background profile, the second lock-in amplifier is introduced. The pumping radiation is on-off modulated by the optical chopper at 1.5 kHz. The output of the lock-in amplifier #1 is lock-in detected by the lock-in amplifier #2 at this modulation frequency. The time constant of the lock-in amplifier #2 is 3 ms. The resultant signal from the lock-in amplifier #2 is shown in FIG. 2(c). The demodulated signal becomes zero near the line centers of F=4→F'=4, 5 transitions. The laser frequency can be locked on the line centers by using this signal as an error signal. The error signal is fed back to the PZT through a servo-controller consisting of an integrator and a proportional amplifier. The shift of the lock points from exact resonance is discussed later.

Generally, the frequency stability of a laser is estimated by measuring the Allan variance on the beat note with two sets of the laser source. Under the influence of white noise, the square root of the Allan variance is determined by $$\sigma_y(\tau) \approx \frac{1}{QS/N} \tau^{-1/2}. \quad (1)$$

Here Q is the quality factor of the resonance used for the frequency discrimination, S/N is the signal-to-noise ratio of the error signal, and τ is the averaging time (H. Talvitie, M. Merimaa, E. Ikonen: Opt. Commun. 152, 182 (1998)). Q is inversely proportional to the line width of the resonance. In the thin cell spectroscopy, increasing the cell length improves the S/N, but simultaneously causes broadening of the resonance. To find the optimum cell length for frequency stabilization, measurements of the line width and the amplitude of the lock-in detected spectrum were taken. The intensity of the pumping beam was fixed to 1.3 mW/cm² throughout the measurements.

Figure 3:
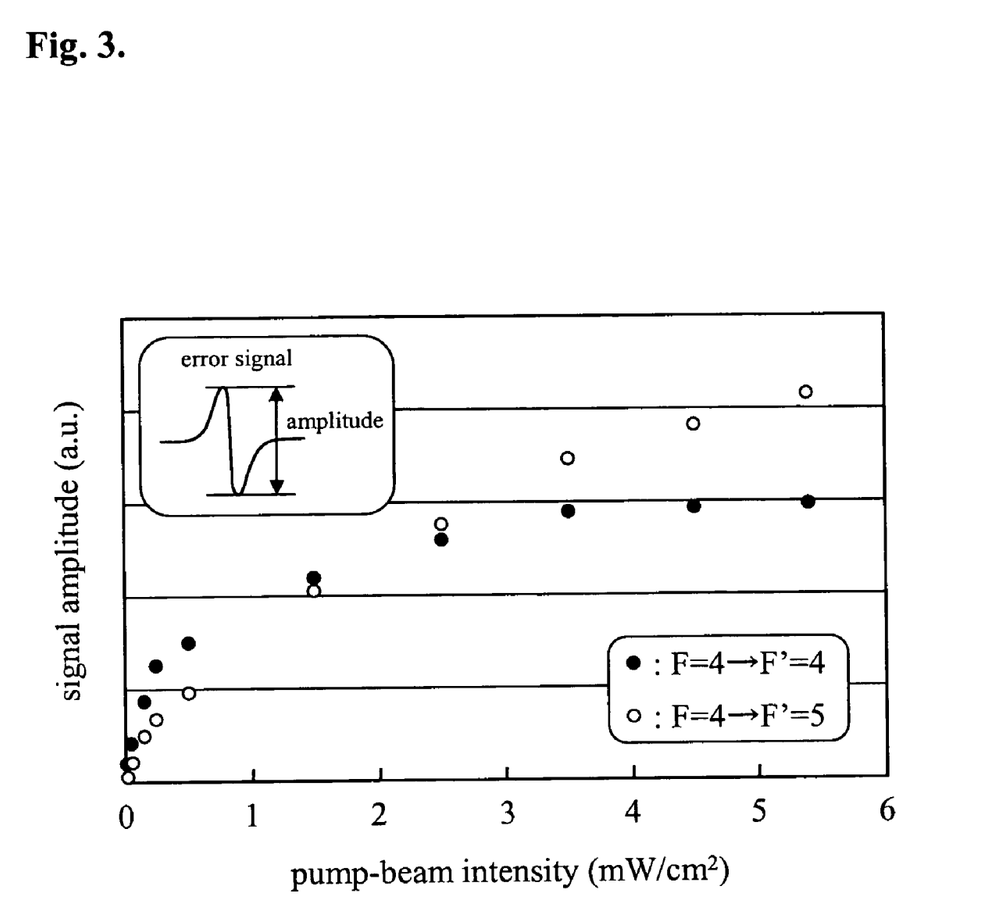
FIG. 3 shows dependence of the line width of the observed error signal on the cell length. Closed circles denote data for the F=4→F'=4 component, and open circles denote data for the F=4→F'=5 component.
Figure 4:
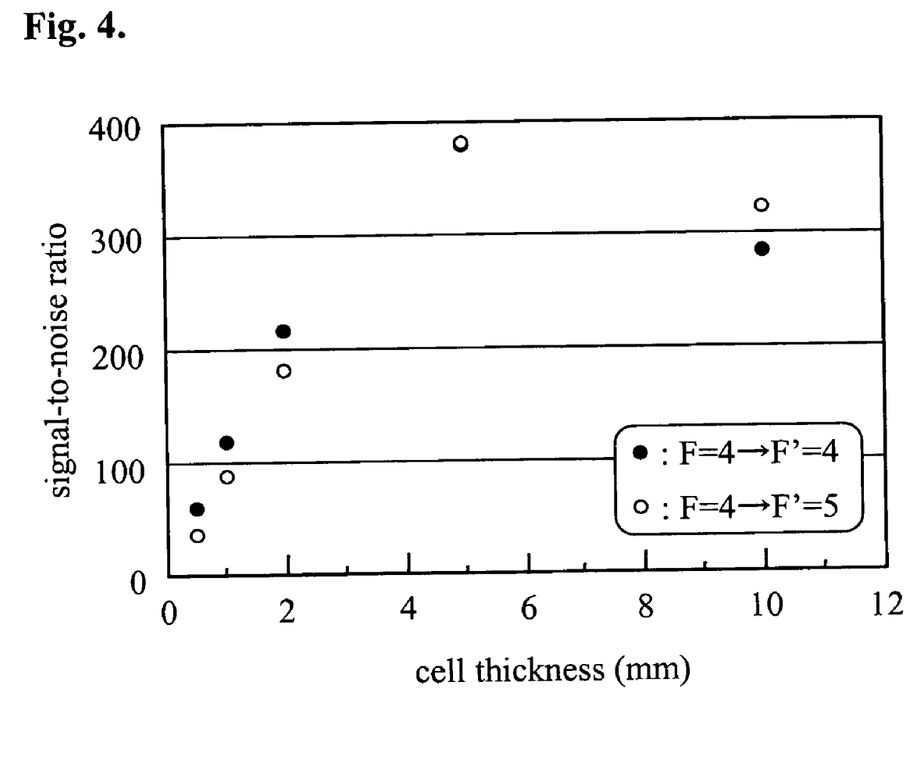
FIG. 4 shows Dependence of the signal-to-noise ratio of the observed error signal on the cell length. Closed circles denote data for the F=4→F'=4 component, and open circles denote data for the F=4→F'=5 component.
Figure 5:
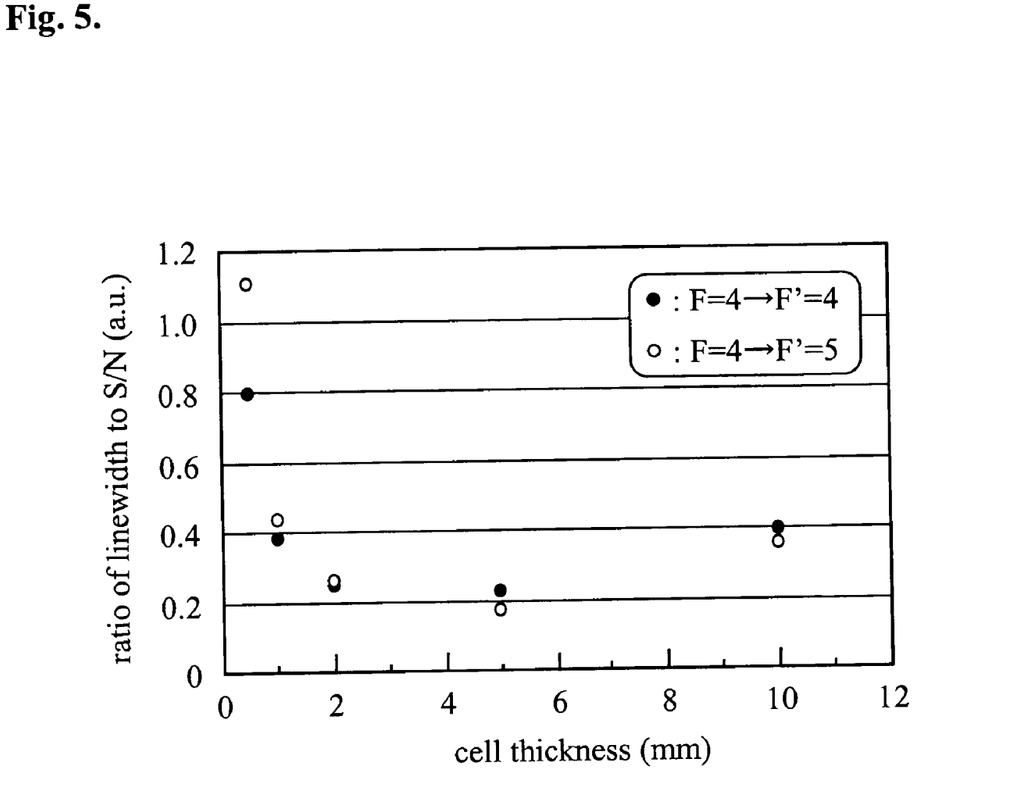
FIG. 5 shows Dependence of the ratio of line width to signal-to-noise ratio on the cell length. Closed circles denote data for the F=4→F'=4 component, and open circles denote data for the F=4→F'=5 component.

FIG. 3 shows the observed dependence of the line width of the error signal on the cell length. The line width is determined from the peak-to-peak frequency difference of the first derivative signal. The measured line width becomes broader with an increase in the cell length because the velocity selectivity degrades for longer cells. Since the off-resonantly pumped atoms mainly contribute to the F=4→F'=5 component, its sub-Doppler spectrum is sharper than the F=4→F'=4 component (M. Otake, K. Fukuda, M. Tachikawa: Appl. Phys. B 74, 503 (2002)). FIG. 4 shows the dependence of the peak-to-peak amplitude of the first derivative signal on the cell length. The estimated amplitude becomes larger with the cell length up to 5 mm. However, the amplitude of the 10-mm cell is smaller than that of the 5-mm cell. As the cell becomes longer, the number of absorbing atoms increases, but the spectrum is more broadened. In this trade-off situation between the two factors, the amplitude of the first derivative signal reaches its maximum around 5 mm. In FIG. 5, the ratio of the line width to the amplitude is plotted against the cell length. This shows that the best frequency stability was obtained with the 5-mm cell in the experiment.

Figure 6:
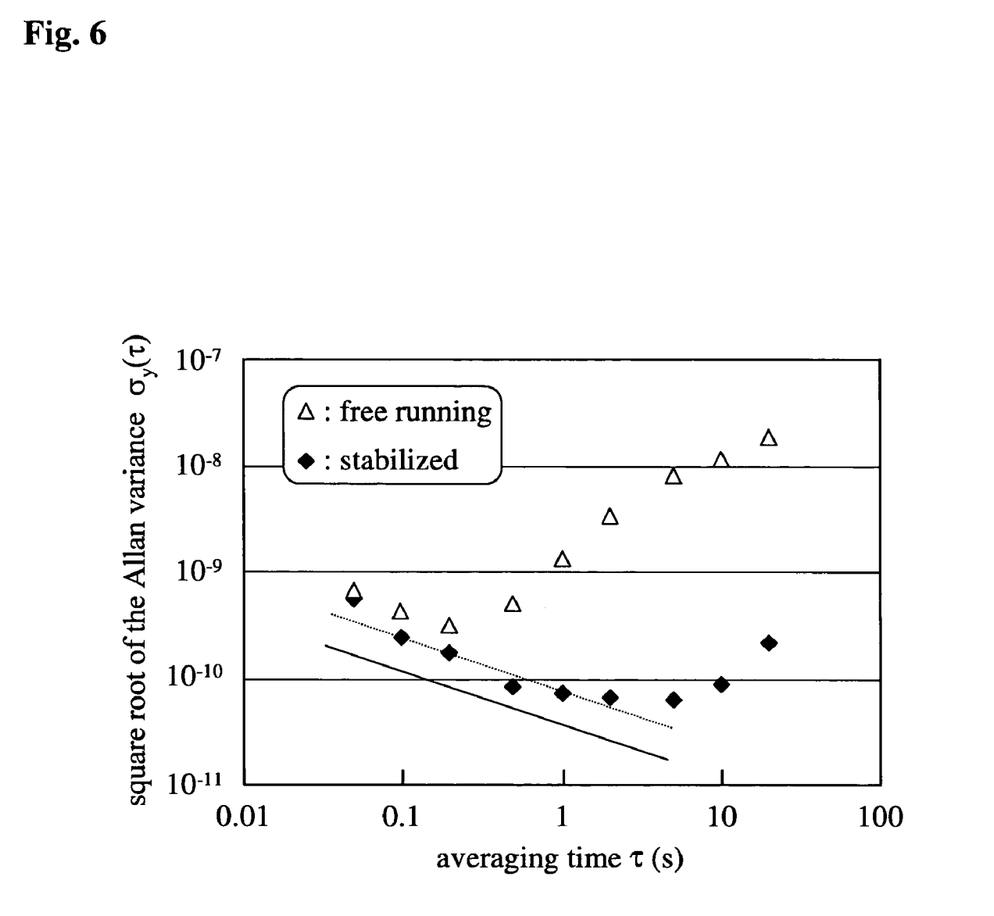
FIG. 6 shows the Square root of the Allan variance of the beat note between two ECDLs. Triangles denote data for two free-running lasers, and diamonds denote those for two frequency-stabilized lasers. The dashed line represents the theoretical curve (1). The solid line indicates the shot noise limit of the square root of the Allan variance.

Next, two sets of the ECDL thus stabilized with 5 mm-cells were prepared and the Allan variance of the beat note between the two lasers was measured. One laser is locked to the F=4→F'32 4 component and the other to the F=4→F'32 5 component, yielding a beat frequency of 250 MHz. The pumping intensity is 1.3 mW/cm², where the ratio of line width to S/N for the F=4→F'32 4 component and that for the F=4→F'32 5 component are almost equal. FIG. 6 shows the square root of the Allan variance $\sigma_y$ of the beat frequency as a function of the averaging time τ. It is clearly observed from a comparison with free-running lasers that the servo-loop improves the frequency stability by one to two orders of magnitude for averaging times longer than 0.5 s. The stability $\sigma_y$ shown in FIG. 6 reasonably fits to the theoretical line (eq. (1)) for τ shorter than 10 s. The frequency fluctuation is mostly due to the white noise in this range. The minimum $\sigma_y$ is $6.2 \times 10^{-11}$ at 5 s. The stability degrades with the averaging time after 10 s because of the room-temperature drift caused by imperfect air conditioning.

Figure 7:
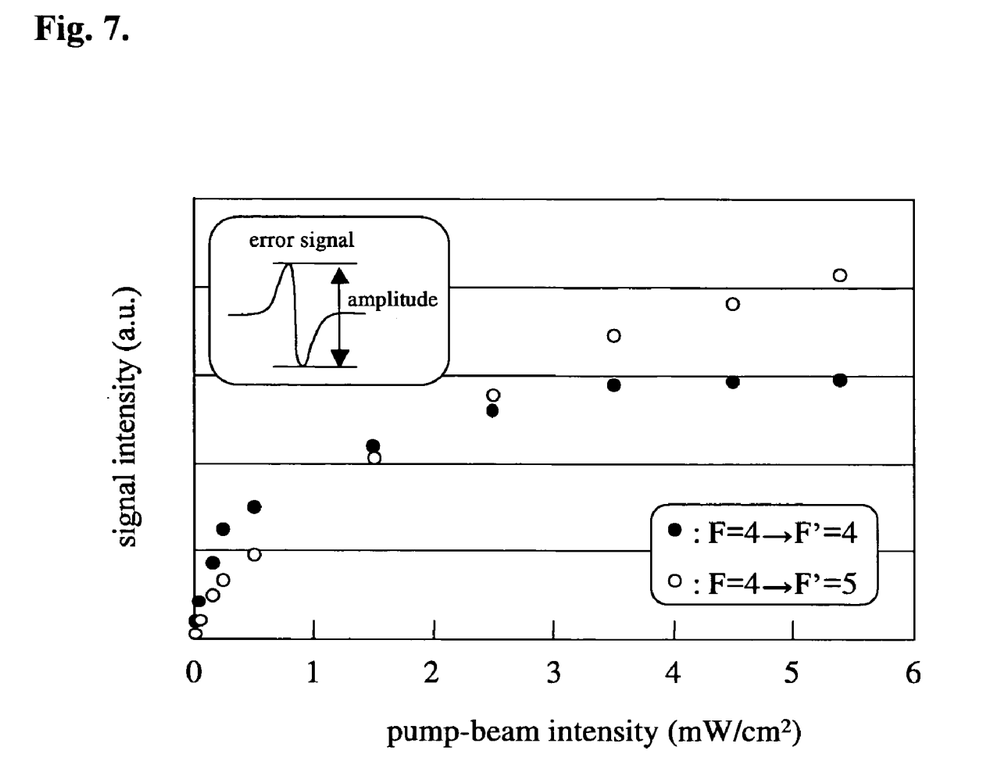
FIG. 7 shows Dependence of the observed amplitude of the error signal on the pumping-beam intensity. The cell length is 1 mm. Closed circles denote data for the F=4→F'=4 component, and open circles denote data for the F=4→F'=5 component.

To evaluate feasibility of this stabilization method at low laser power, the dependence of the sub-Doppler resonance on the pumping intensity was investigated. FIG. 7 shows the amplitude of the observed first derivative signal plotted against the pumping intensity. Both F=4→F'=4 and F=4→F'=5 components monotonically increase with the pumping intensity. The curve for the F=4→F'=4 component tends to be flat at much lower intensities than that for the F=4→F'=5 component. This is explained as follows. When the laser frequency is around F=4→F'=5 resonance, optical pumping occurs via the F=4→F'=4 transition. The saturation intensity for this off-resonant transition is much larger than the resonant case in which the laser frequency is around the F=4→F'=4 resonance [M. Otake, K. Fukuda, M. Tachikawa: Appl. Phys. B 74, 503 (2002)]. Even for low intensity, below 500 µW/cm², the first derivative spectrum is observable with reasonably good S/N.

Figure 8:
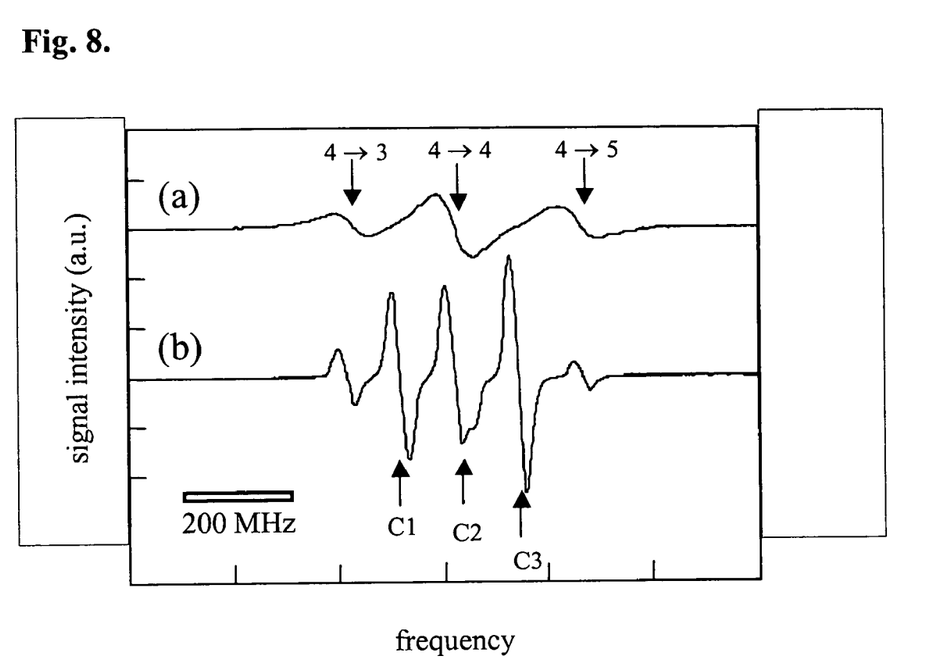
FIG. 8 shows first derivative signal of the absorption spectrum of the Cs $D_2$ line observed in the thin-cell spectroscopy FIG. 8(a) and the conventional saturated absorption spectroscopy FIG. 8(b). The cell length is 5 mm. The pumping intensity is 100 µW/cm$^2$ for both cases. The symbols C1, C2 and C3 represent the crossover resonance due to the pairs of transitions to the states with F'=3 and 4, F'=3 and 5, and F'=4 and 5 in the excited state, respectively.

FIG. 8(a) shows the first derivative spectrum observed when the pumping intensity is quite low (100 µW/cm²). The cell length is 5 mm, and the probe intensity is 20 µW/cm². The saturated absorption signal, obtained with the same parameters for the laser beam and the cell, is presented for comparison in FIG. 8(b). The signal amplitude and the spectral Q value of the thin cell method are as good as those of the conventional saturated absorption spectrum. In the saturated absorption spectrum, the F=4→F'=4 (ΔF=0) line and the cross-over resonance C2 caused by the F=4→F'=3 transition and F=4→F'=5 transition overlap each other (see FIG. 8(b)).

The major advantage of the thin cell spectroscopy is that it is free from the cross-over resonance which prevent clear observation of the ΔF=0 transition.

To remove the Doppler-broadened background, an on-off lock-in detection with an optical chopper is used in this experiment. The population relaxation of the ground hyperfine states is mainly due to collisions with the end walls. The relaxation time constant is determined by the flight time between the walls, 25 µs for 200 m/s atoms in the 5-mm cell. The atom system accepts the on-off modulation up to several tens kHz.

A rate equation analysis was conducted, the details of which are presented in [M. Otake, K. Fukuda, M. Tachikawa: Appl. Phys. B 74, 503 (2002)], and the frequency shifts of the lock points for a numerically reproduced spectral profile were estimated. The frequency at which the first derivative of the spectrum becomes zero is approximately 30 kHz lower than the line center in the case of the F=4→F'=4 component, and it is 740 kHz lower than that of the F=4→F'=5 component.

Systematic shifts of the lock points due to the Doppler background can be reduced largely by use of the third derivative of the absorption spectrum. Compared to the first derivative spectrum, the third derivative spectrum has narrower linewidth but smaller S/N [A. Izmailov, K. Fukuda, M. Kinoshita, M. Tachikawa: Laser Phys. Vol. 14, 30 (2004)]. The SIN and the spectral Q value of these spectra with the same parameters for the laser beam and the cell have been measured. The spectral Q value of the third derivative spectrum is approximately three times as large as that of the first derivative spectrum. However, the S/N of the third derivative spectrum is approximately $1/40$ as large as that of the first derivative spectrum. For a long-term stability, the first derivative spectrum, obtained by on-off lock-in detection with an optical chopper, is better than the third derivative spectrum.

It has thus been demonstrated herein that the sub-Doppler spectrum observed with a thin Cs vapor cell can be used to frequency-stabilize an extended-cavity diode laser. The results of the experiments conducted indicate that the best frequency stability is obtained for the cell length of 5 mm. The minimum $\sigma_y$ of $6.2 \times 10^{-11}$ has been achieved with an incident probe intensity of 20 µW/cm² at an averaging time of 5 s. The sub-Doppler resonance is clearly observed even at a relatively low pumping intensity of 100 µW/cm². This method avoids crossover resonance, which may essentially complicate the spectral analysis and the laser frequency stabilization.

According to the present invention, since the frequency of the laser beam can be stabilized, the invention can be used in for technique using the ECDL.

According to the invention, since the frequency of the laser beam can be stabilized, the invention can be used in a field which utilizes extremely precise laser frequency such as an atom clock.

What is claimed is:

1. A laser frequency stabilization device comprising:
   a cell into which gas is charged,
   an ECDL,
   a laser frequency adjusting means for adjusting the frequency of laser a beam emitted from said ECDL,
   a laser beam dividing means for dividing the laser beam from said ECDL into a pump beam and a probe beam,
   an ON/OFF means for cutting off the pumping beam at a constant time interval,
   a photo detector for measuring intensity of the probe beam after the probe beam is passed through said cell continuously and said pumping beam is passed through at intervals,
   a computing means for obtaining the intensity of the probe beam detected by said photo detector, a demodulated signal of the probe beam, a difference in intensity of the probe beam between a case in which the pumping beam is ON and OFF, and a difference in demodulated signal,
   a feedback means for feeding back information concerning the difference in the demodulated signal obtained by said computing means, to said laser frequency adjusting means which thereby stabilizes the frequency of said ECDL based on said information,
   a first optical setup for introducing the probe beam into a flat surface of said cell, and a second optical setup for introducing the pumping beam into a side surface of said cell.

2. A laser frequency stabilization device according to claim 1, wherein said cell is square pole or cylindrical in shape.

3. A laser frequency stabilization device according to claim 1, wherein a length of said cell is 3 mm to 7 mm.

4. A laser frequency stabilization device according to claim 1, wherein said cell is cylindrical in shape and a length of said cell is 5 mm.

5. A laser frequency stabilization device according to claim 1, wherein the gas charged into said cell is cesium atom.

6. A laser frequency stabilization device according to claim 1, wherein the gas charged into said cell is cesium atom, said ECDL is adjusted such that its frequency is tuned to a $D_2$ line of the cesium atom.

7. A laser frequency stabilization device according to claim 1, wherein the number of said ECDL. is one, and a wavelength of laser beam showing the maximum intensity is 850 nm to 854 nm.

8. A laser frequency stabilization device according to claim 1, wherein said laser frequency adjusting means includes injection current control means which controls current injected into said ECDL and/or voltage control means which controls voltage to be applied to said ECDL.

9. A laser frequency stabilization device according to claim 1, wherein said ON/OFF means is an optical chopper that rotates at a predetermined velocity.

10. A laser frequency stabilization device according to claim 1, wherein
   said second optical setup has optical means for increasing a beam diameter of the pumping beam.

11. A laser beam frequency stabilization method using the sub-Doppler spectrum of atoms, comprising
   a beam dividing process which divides a laser beam from an ECDL to obtain a pumping beam and a probe beam,
   a beam introducing process for introducing the pumping beam and the probe beam divided by the beam dividing process into a cell in which gas is charged,
   an ON/OFF means for causing irradiation/no irradiation of the pumping beam to the cell at a constant time interval,
   a first demodulated signal obtaining process which modulates the frequency of the laser beam by laser frequency adjusting means for lock-in detection to obtain a demodulated signal of the probe beam,
   a second demodulated signal obtaining process in which lock-in detection which is in synchronization with said constant time interval is carried out to obtain a demodulated signal of the probe beam,
   a feedback process for feeding back, to the laser frequency adjusting means, an error signal obtained from the demodulated signal of the probe beam obtained in the second demodulated signal obtaining process,
   a first optical setup process for introducing the probe beam into a flat surface of said cell, and a second optical setup process for introducing the pumping beam into a side surface of said cell.

* * * * *